United States Patent
Genty et al.

(10) Patent No.: US 6,785,723 B1
(45) Date of Patent: Aug. 31, 2004

(54) TRACKING THE TRANSMISSION OF WEB DOCUMENTS OR FILES SENT FROM RESOURCE LOCATIONS THROUGH SERVERS ON THE WEB TO CLIENT COMPUTER STATIONS WHICH SEND TRACKED TRANSMISSION CHARACTERISTICS DATA BACK TO SAID SERVERS

(75) Inventors: Denise Marie Genty, Austin, TX (US); Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 09/599,178

(22) Filed: Jun. 22, 2000

(51) Int. Cl.[7] .............................. G06F 15/173
(52) U.S. Cl. ................ 709/224; 709/224; 709/203; 709/217; 709/219
(58) Field of Search ................ 709/223, 203, 709/224, 217, 219, 229, 246

(56) References Cited

U.S. PATENT DOCUMENTS

| | | | | |
|---|---|---|---|---|
| 6,243,761 B1 | * | 6/2001 | Mogul et al. | 709/246 |
| 6,393,407 B1 | * | 5/2002 | Middleton et al. | 705/14 |
| 6,438,578 B1 | * | 8/2002 | Schmid et al. | 709/203 |
| 6,513,060 B1 | * | 1/2003 | Nixon et al. | 709/203 |
| 2002/0116494 A1 | * | 8/2002 | Kocol | 709/246 |

FOREIGN PATENT DOCUMENTS

| | | | | |
|---|---|---|---|---|
| WO | WO 200242979 A1 | * | 5/2002 | G06F/17/60 |
| WO | WO 200284507 A1 | * | 10/2002 | G06F/15/16 |

\* cited by examiner

Primary Examiner—Hosain Alam
Assistant Examiner—Oanh Duong
(74) Attorney, Agent, or Firm—Diana L. Roberts

(57) ABSTRACT

Tracking the success or failure of and the quality of communications between requesting client station computers and servers, particularly servers for accessing resource locations for the present complex and circuitous environment. Conventional browsers are provided for requesting the transmission of data components from one of said resource locations to one of said client stations. There are also implementations, associated with the client station requesting the transmission of data components, for tracking characteristics of said transmission in combination with sending said tracked characteristics to at least one network server on the path of said transmission. In the complex World Wide Web (Web) environment, while the resource location server does not know where its thousand of "hits" are coming from, each requesting client station of those thousands does know the Uniform Resource Locator (URL) or address of the server. Thus, the properties and characteristics of the transmission from the resource location are tracked at the requesting client station. Then, after a request and resulting transmission, or in the case of a failed transmission, after the first successful transmission after the failed transmission, the requesting client location sends tracked data to the server relative to the failed transmission, as well as any data pertinent to the successful transmission.

15 Claims, 4 Drawing Sheets

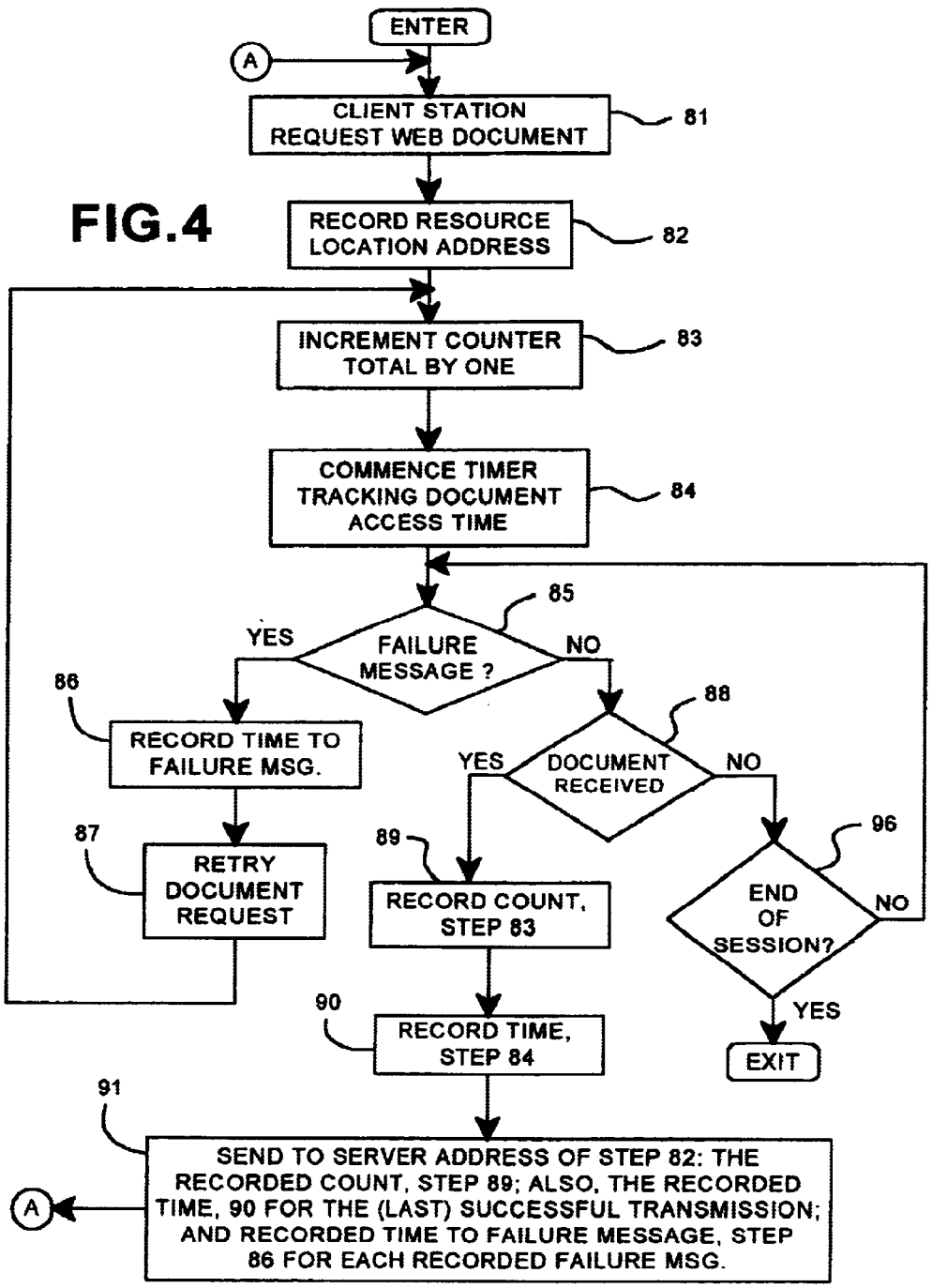

TRACKING THE TRANSMISSION OF WEB DOCUMENTS OR FILES SENT FROM RESOURCE LOCATIONS THROUGH SERVERS ON THE WEB TO CLIENT COMPUTER STATIONS WHICH SEND TRACKED TRANSMISSION CHARACTERISTICS DATA BACK TO SAID SERVERS

TECHNICAL FIELD

The present invention relates to computer managed communication networks such as the World Wide Web (Web) and, particularly, to the tracking of the successes and failures in the transmission of documents from network server accessed resource locations on the network to the requesting user operated client computer stations on the network.

BACKGROUND OF RELATED ART

The 1990's decade has been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents, media and files. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents and computer files. This rapid expansion has brought hundreds of millions of Web users at hundreds of millions of Web stations, i.e. client computer stations on the Web. In addition, Hypertext Markup Language (HTML), which had been the documentation language of the Internet or Web for years, offered direct links between Web pages. This even further exploded the use of the Internet or Web.

Web documents are provided from a Web distribution site or resource location usually made up of one or more network or Web server computers which access the document from a resource database in response to a user request sent over the Web, usually through a Web browser on the user's receiving client computer station. Web distribution sites or resource locations usually serve large institutions such as corporations, universities, retail stores or governmental agencies. These distribution sites may also provide to smaller businesses or organizations support for and distribution of individual Web pages created, owned and hosted by the individual small businesses and organizations. The network server computers which control the document and file distribution over the Web or Internet (terms are used interchangeably), include, in addition to servers which are at the resource locations, the Web servers of the Web service providers, through which the receiving client computer stations are connected into the Web, as well as servers at the other end which may also be servers managed by Web service providers that in turn connect the resource accessing servers into the Web. Thus, the path from the requesting client station to the server which accesses the distribution site or resource location could be through tens of thousands of possible paths with each path involving multiple servers.

Accordingly, tracking the success or failure of and the quality of communications between requesting client station computers and servers, particularly servers for accessing resource locations, is so circuitous and complex that most of the conventional "handshaking" routines are ineffective for these purposes. For conventional "handshaking" to be effective, there has to be some manner of predetermination as to which client sites or stations will be communicating with which servers.

With the Web, where there could be up to millions of "hits" through the server system accessing a particular resource distribution location, this, of course, is an impossibility. In the earlier more tranquil days on the Web or Internet, it was not unusual for a user at one university to telephone a resource distribution location manager at another university or a government agency to report or inquire about communication difficulties with the resource location or with documents received from the location. This is also inadequate for the tracking of communications in the present Web environment.

SUMMARY OF THE PRESENT INVENTION

The present invention provides a solution to the problem of tracking the success or failure of and the quality of communications between requesting client station computers and servers, particularly servers for accessing resource locations for the present complex and circuitous environment. Conventional means are provided for requesting the transmission of data components from one of said resource locations to one of said client stations. There are also means associated with the client station requesting the transmission of data components for tracking characteristics of said transmission in combination with means for sending said tracked characteristics to at least one network server on the path of said transmission. In the complex Web environment, while the resource location server does not know where its thousand of "hits" are coming from, each requesting client station of those thousands does know the Uniform Resource Locator (URL) or address of the server. Thus, the properties and characteristics of the transmission from the resource location are tracked at the requesting client station. Then, after a request and resulting transmission, or, in the case of a failed transmission, after the first successful transmission after the failed transmission, the requesting client location sends tracked data to the server relative to the failed transmission, as well as any data pertinent to the successful transmission. This invention is applicable to transmitted Web documents or pages, as well as to transmitted files in network file systems where the resource location server accesses files from am appropriate database.

Some typical characteristics which may be tracked are the number or count of failed transmissions, the Web address of the resource of the failed transmission and the lapse of time between the request and a failure message. In the case of completed transmissions, it will be the lapse of time between the request and the receipt of the requested data that is tracked. The resource location servers have to, of course, be set up to receive and analyze the tracked data to thereby correct or improve the transmissions. While the present illustrations are concentrated on the resource location servers, it will be understood that intermediate servers in the path between the requesting client-users and the resource location could also benefit from the receipt of this tracked transmission data, e.g. the providers of the Web service and connection.

The present invention may be conveniently implemented in the browser serving the client station, which, in addition to having the means for requesting the transmission of data components, would also include the means for tracking characteristics of said transmission, and the means for sending said tracked characteristics to at least one network server on the path of said transmission.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 4 is a flowchart of an illustrative run of the program set up in FIG. 3.

DETAILED DESCRIPTION OF THE PREFERRED EMBODIMENT

Figure 1:
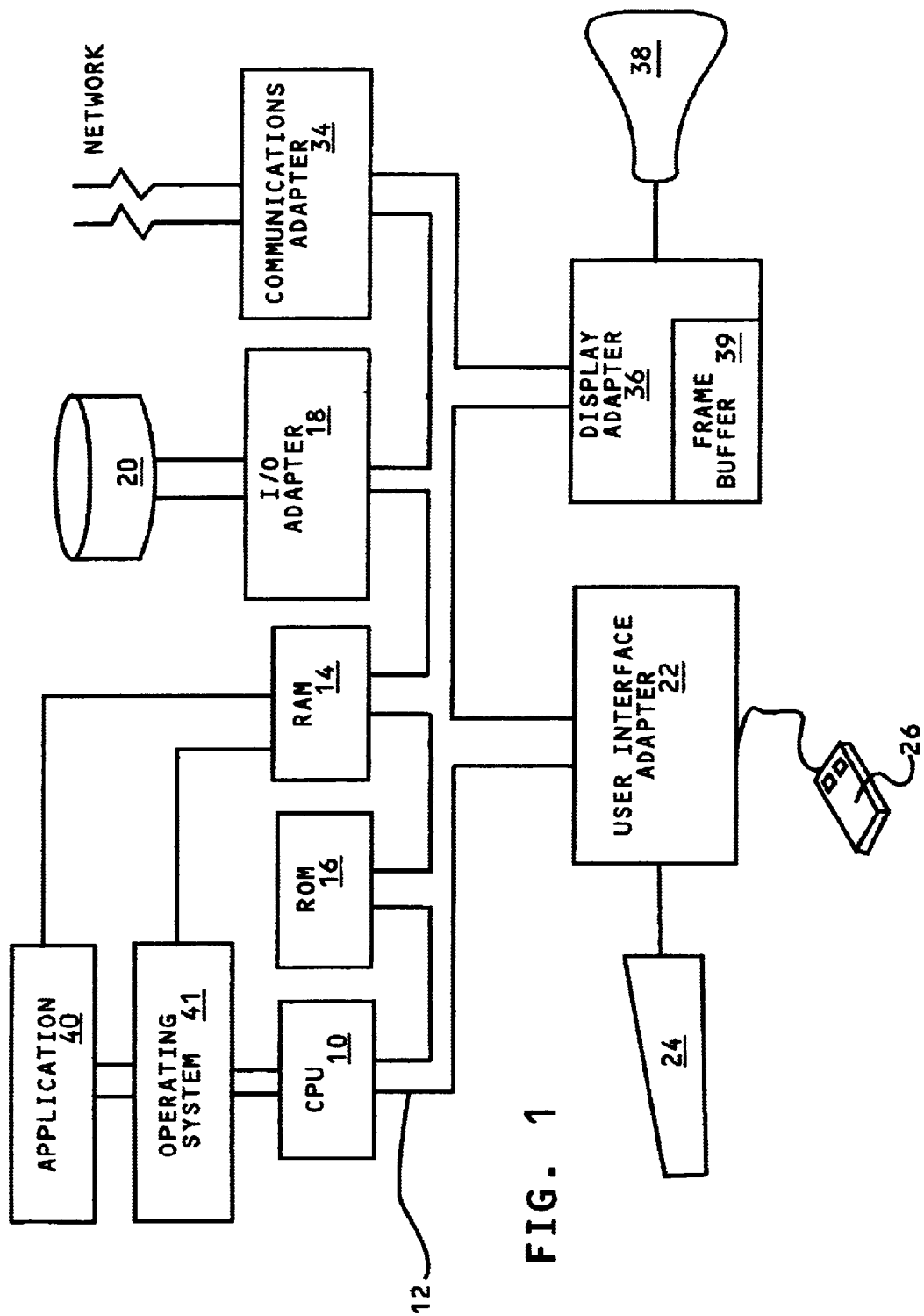
FIG. 1 is a block diagram of a data processing system including a central processing unit and network connections via a communications adapter which is capable of implementing a user interactive workstation on which transmission characteristics may be tracked and forwarded to resource servers in accordance with the present invention.
Figure 2:
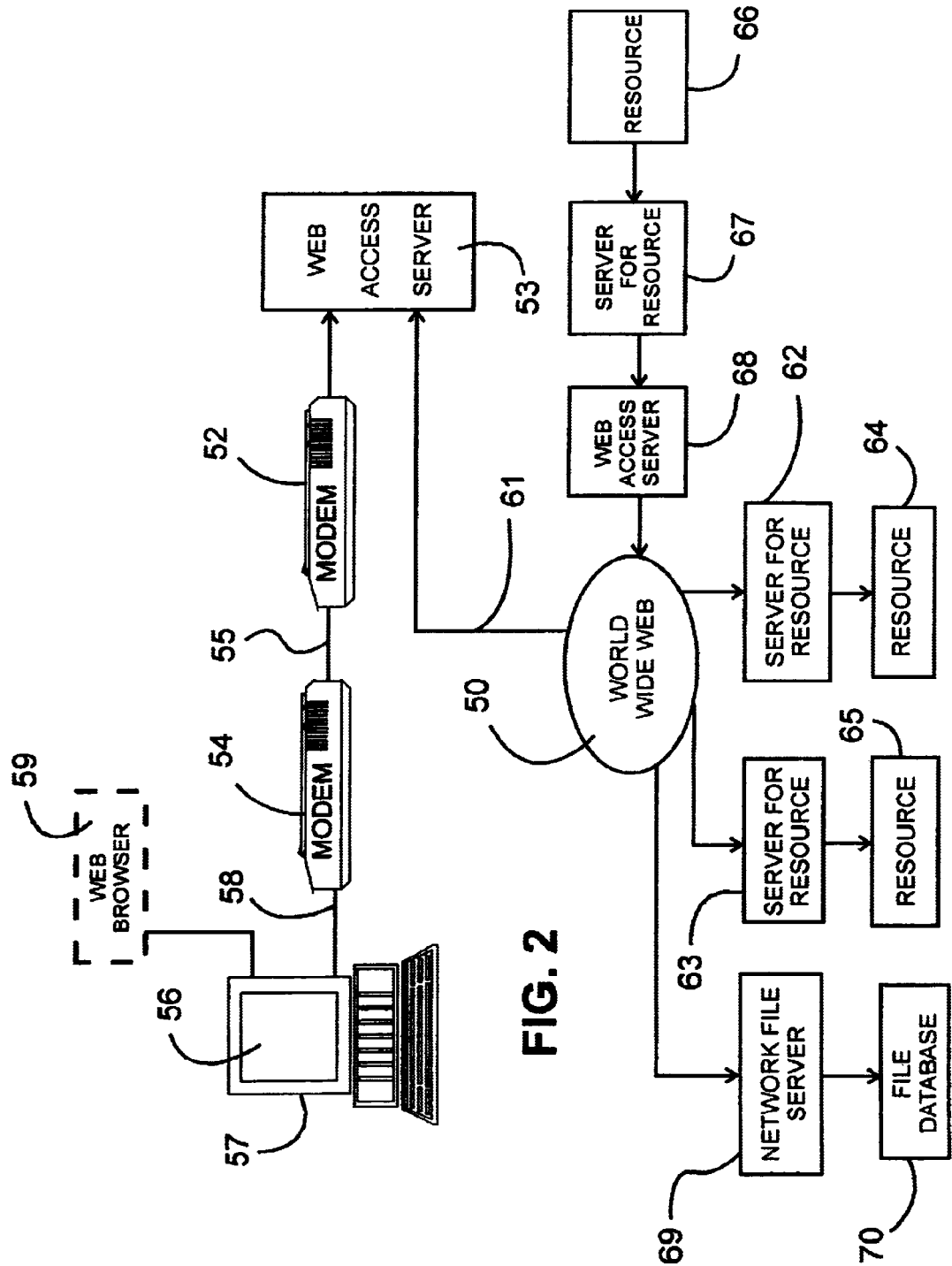
FIG. 2 is a generalized diagrammatic view of a World Wide Web portion upon which the present invention may be implemented.

Referring to FIG. 1, a typical data processing system is shown which may function as the client computer stations or Web stations used conventionally as the receiving client stations for requesting Web pages; the system shown is also illustrative of any of the server computers used in the Web resource location or resource distribution sites to be described in greater detail with respect to FIG. 2.

A central processing unit (CPU) 10, such as one of the PC microprocessors or workstations, e.g. RISC System/6000™ (RS/6000) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows 98™ or Windows NT™, as well as UNIX and AIX operating systems. Application programs 40, controlled by the system, are moved into and out of the main memory Random Access Memory (RAM) 14. These programs include the programs of the present invention for the tracking of Web document and Web file transmission characteristics and the sending of the tracked characteristics to Web resource servers. These functions will be subsequently described in greater detail in combination with any conventional Web browser, such as the Netscape Navigator 3.0™ or Microsoft's InternetExplorer/™ A Read Only Memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network enabling the data processing system to communicate with other such systems over a Local Area Network (LAN) or a Wide Area Network (WAN), which includes, of course, the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to Web documents, pages or files. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods which may be related to the present invention. Since a major aspect of the present invention is directed to Web documents, pages or files transmitted over global networks, such as the Web or Internet, an understanding of networks and their operating principles would be helpful. We will not go into great detail in describing the networks to which the present invention is applicable. For details on Web nodes, objects and links, reference is made to the text, *Mastering the Internet*, G. H. Cady et al., published by Sybex Inc., Alameda, Calif., 1996; or the text, *Internet: The Complete Reference, Millennium Edition*, Margaret Young et al., Osborne/McGraw-Hill, Berkeley, Calif., 1999.

Any data communication system which interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. Web documents are conventionally implemented in HTML language, which is described in detail in the text entitled *Just Java*, van der Linden, 1997, SunSoft Press, particularly at Chapter 7, pp. 249–268, dealing with the handling of Web pages; and also in the above-referenced *Mastering the Internet*, particularly pp. 637–642, on HTML in the formation of Web pages. In addition, aspects of this invention will involve Web browsers. A general and comprehensive description of browsers may be found in the above-mentioned *Mastering the Internet* text at pp. 291–313. More detailed browser descriptions may be found in the above-mentioned *Internet: The Complete Reference, Millennium Edition*: Chapter 19, pp. 419–454, on the Netscape Navigator; Chapter 20, pp. 455–494, on the Microsoft Internet Explorer; and Chapter 21, pp. 495–512, covering Lynx, Opera and other browsers.

While the illustrative examples which are being used relate to Web pages and documents, it should be understood that the present invention is also applicable to the accessing of other data components from networks such as the accessing of files. The transmission of files and their access from the Web is described in detail in the above-mentioned text, *Internet: The Complete Reference. Millennium Edition*: Chapters 36, 37 and 38, pp. 830–881; Web File Transfer Protocols (FTP) which are described at pp. 840–863 are used. Also, the handling and accessing of files through Web browsers using FTP is discussed on pp. 860–861.

A generalized diagram of a portion of the Web in which the computer controlled display terminal 57 is used for receiving Web pages or documents using a Web browser 59 is connected as shown in FIG. 2. Client computer display terminal 57 with display 56 may be implemented by the computer system setup in FIG. 1 and connection 58 (FIG. 2) is the network connection shown in FIG. 1. Reference may be made to the above-mentioned *Mastering the Internet*, pp. 136–147, for typical connections between local display stations to the Web via network servers, any of which may be used to implement the system on which this invention is used. The system embodiment of FIG. 2 has a host-dial connection. Such host-dial connections have been in use for over 30 years through network access servers 53 which are linked 61 to the Web 50. The servers 53 may be maintained by a service provider to the client's display terminal 57. The host's server 53 is accessed by the client terminal 57 through a normal dial-up telephone linkage 58 via modem 54, telephone line 55 and modem 52. Web documents are downloaded to display terminal 57 through Web access server 53 via the telephone line linkages from server 53, which may have accessed them from the Web 50 via linkage 61.

As set forth above, the Web is made up of a hierarchy of servers connecting the requesting client computer display stations to the Web documents and file distribution sites or resource locations which are addressed or accessed through a Uniform Resource Location (URL). Thus, a request from a client station to a resource location and the resulting transmission of a Web document back to the client may involve a path of several servers. Any server along such a path may be set up to receive the tracked information of this invention. For simplicity in illustration we will describe the sending of the tracked data on transmission characteristics to the servers for directly accessing the resource locations, e.g. Web sites. These resource accessing servers are most likely to find the tracked data of great value. Server 67 accessing resource 66, server 62 accessing resource 64, server 63 accessing resource 65 and file server 69 which accesses file database 70 are illustrative of such servers. While servers 62, 63 and 69 are shown as directly connected to the Web 50, it will be understood that all of these servers could be connected to the Web through other servers, such as Web access server 68 which connects transmissions from resource 66 through accessing server 67 to the Web 50. As will be subsequently described in greater detail, request for Web documents or files by client station 57 are distributed through browser program 59, which further contains program steps for monitoring characteristics of the request and resulting transmission from a designated resource location, 64, 65 or 66, or file database resource 69. When a successful transmission is returned from the selected resource responsive to the request, then the browser sends to the server, either 62, 63, 67 or 69 for respectively accessing the designated resource, all of the data which the browser has tracked on the transmission characteristics.

Figure 3:
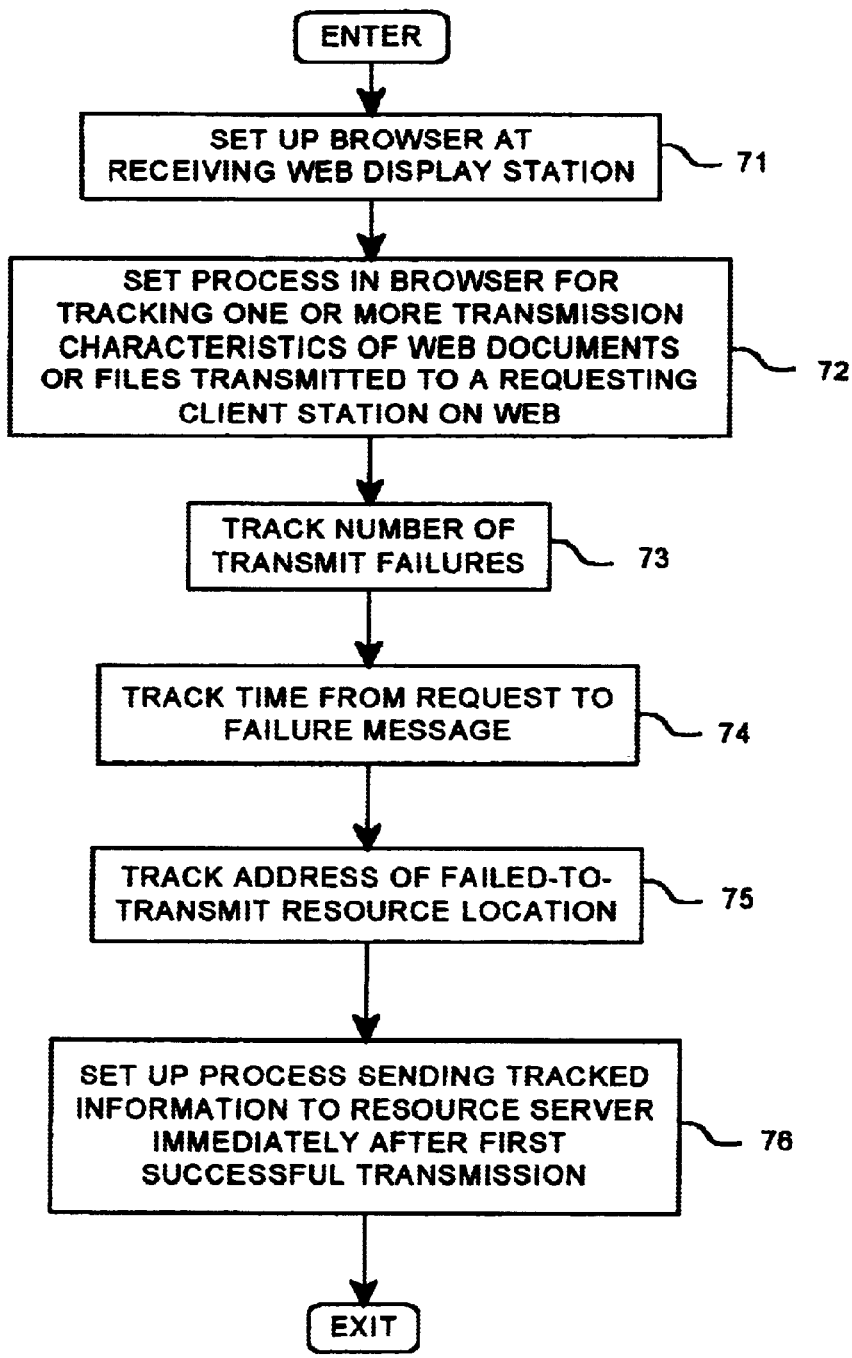
FIG. 3 is an illustrative flowchart describing the setting up of the elements needed for the program for tracking of transmission characteristics and the forwarding of such tracked data to resource location servers.

FIG. 3 is a flowchart showing the development of a process according to the present invention for tracking transmission characteristics at the requesting client Web station and for sending the tracked data to the appropriate servers that requested access to the documents. A Web browser is provided at a receiving client display station on the Web for accessing Web documents, pages or files in the conventional manner and downloading them at the receiving display station, step 71. A process is set up within the browser program for keeping track of one or more characteristics of the transmission in response to a request for such documents, step 72. Since the client station Web browser initiates the document or file request, it has a great deal of initial information concerning the request and eventual transmission. It knows how many attempts to request have been made so it can readily keep track of failures to transmit, step 73; since the client station initiates the request, it can easily track the amount of time that it takes to get a return failure message, step 74; and since the browser at the requesting client station knows the URLs of the resource locations or distribution sites, it can track the addresses of such resources, step 75. Steps 73 through 75 are just a few examples of the type of information regarding requests and return transmissions which may conveniently be tracked at a requesting client station. Since the requested resource location cannot readily determine where its thousands of hits are coming from, it can be seen how the requesting stations are in a position to track and send to the resource location servers all kinds of tracked information regarding transmission characteristics that the resource's server could not otherwise have. A process is set up to send this tracked information to the resource server immediately after the first successful transmission, step 76. If this first successful transmission is the initial transmission, i.e. no complete failures to transmit requiring retries, then, there may still be information about the completed transmission that is of value to the server, e.g. the amount of time from the request to the receipt of the document.

The key to this invention is in the tracking and sending to the resource servers transmission data which the resource server is not in a position to otherwise receive because of the thousands of unknown requesters making the hits on the resource server. The resource servers have to be set up to receive and store such incoming information. The servers may then use any desired diagnostic routines to analyze such transmission characteristics data so as to correct transmission shortcomings or to generally improve service.

While this example has focused on sending the tracked information to the resource location servers, it should be understood that at least some of the tracked transmission characteristics could be of value to intermediate servers in the path of the request to the resource and the return of the transmitted Web document. In such cases, the interested intermediate servers would have to be prepared to receive and store the transmission characteristics forwarded to them from the requesting client station Web browser. Here too, the intermediate servers may then analyze such stored data with diagnostic tools appropriate to the intermediate servers' information needs.

The running of the process set up in FIG. 3 will now be described with respect to the flowchart of FIG. 4. The flowchart represents some steps in a routine which will illustrate the operation of the invention. A document is initially requested from the Web by the browser of the receiving client station, step 81. The address of the resource location of the requested document is recorded, step 82. A counter which keeps track of requests or attempts to access is incremented by "1", step 83, and a timer for tracking document access time is set off, step 84. A determination is then made as to whether there is a failure message, step 85. If Yes, step 86, the time elapsed until the failure message is received is taken off the timer of step 84. Then, a retry of the document request is made, step 87; the process is returned to step 83 where the counter is incremented by another "1"; the process again proceeds to decision step 85. If in turn there is No failure message in step 85, a further determination is made as to whether the requested document has been received, step 88. If No, then a determination may conveniently be made at this point as to whether the session is being ended, step 96. If Yes, the request for the document is exited. On the other hand, when the document is received and the decision from step 88 is, thus, Yes, the number of tries in the counter of step 83 is recorded, step 89, and the access time of step 84 is also recorded, step 90. At this point, there is sent to the resource server address of step 82: the recorded count, step 89; the recorded time, step 90, for the last successful transmission; and the recorded time to failure message, step 86, for each recorded failure message. The procedure is then returned to step 81 via branch "A" where the next client station Web document request may then be made.

One of the preferred implementations of the present invention is in application program 40, i.e. a browser program made up of programming steps or instructions resident in RAM 14, FIG. 1, of a Web receiving station during various Web operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a World Wide Web communication network with user access via a plurality of client computer controlled display stations connected through network server computers to World Wide Web documents transmitted from resource locations on said World Wide Web network remote from said client display stations, a system for tracking the transmission of said Web documents comprising:

means for requesting the transmission of Web documents from one of said resource locations to one of said client display stations;

means, associated with the client display station requesting the transmission of Web documents, for tracking characteristics of said transmission including a first successful transmission of a requested Web document to a requesting display station following a failed transmission of a requested Web document, and means, responsive to the first successful transmission of a requested Web document to said requesting display station following a failed transmission of said requested Web document, for sending said tracked characteristics to at least one Web network server on the path of said requested transmission.

2. The network system of claim 1 wherein said tracked characteristics include the number of failed requests by said one client station for transmission of said World Wide Web documents.

3. The network system or claim 1 wherein said tracked characteristics include the time lapse between a request by said one client station for transmission of said World Wide Web documents and the receipt of a failure of said requested message by one client station.

4. The network system of claim 1 wherein said tracked characteristics include the Web address of the resource location of a failed transmission.

5. The network system of claim 1 further comprising: World Wide Web browsing means at said client station requesting the transmission of World Wide Web documents including:

said means for requesting the transmission of Web documents from one of said resource locations to one of said client display stations;

said means, associated with the client display station requesting the transmission of Web documents, for tracking characteristics of said transmission including a first successful transmission of a requested Web document to a requesting display station following a failed transmission of a requested Web document, and said means, responsive to the first successful transmission of a requested Web document to said requesting display station following a failed transmission of said requested Web document, or sending said tracked characteristics to at least one Web network server on the path of said requested transmission.

6. In a World Wide Web communication network with user access via a plurality of client computer controlled display stations connected through network server computers to World Wide Web documents transmitted from resource locations on said World Wide Web network remote from said client display stations, a method for tracking the transmission of said Web documents comprising:

requesting the transmission of Web documents from one of said resource locations to one of said client display stations;

tracking characteristics of said transmission at the client display station requesting the transmission of Web documents including a first successful transmission of a requested Web document to said requesting display station following a failed transmission of a requested web document, and responsive to the first successful transmission of a requested Web document to said requesting display station following a failed transmission of said requested Web document, sending said tracked characteristics to at least one Web network server on the path of said requested transmission.

7. The method of claim 6 wherein said tracked characteristics include the number of failed requests by said one client station for transmission of said World Wide Web documents.

8. The method of claim 6 wherein said tracked characteristics include the time lapse between a request by said one client station for transmission of said World Wide Web documents and the receipt of a failure of said transmission message by one client station.

9. The method of claim 6 wherein said tracked characteristics include the World Wide Web address of the resource location of a failed transmission.

10. The method of claim 6 further comprising:

a World Wide Web browsing procedure at said client station requesting the transmission of World Wide Web documents including said steps of:

requesting the transmission of Web documents from one of said resource locations to one of said client display stations;

tracking characteristics of said transmission at the client display station requesting the transmission of Web documents including a first successful transmission of a requested Web document to said requesting display station following a failed transmission of a requested Web document, and responsive to the first successful transmission of a requested Web document to said requesting display station following a failed transmission of said requested Web document, sending said tracked characteristics to at least one Web network server on the path of said requested transmission.

11. A computer program having code recorded on a computer readable medium for tracking the transmission of Web documents in a World Wide Web communication network with user access via a plurality of client computer controlled display stations connected through network server computers to World wide Web documents transmitted from resource locations on said World Wide Web network remote from said client display stations comprising:

means for requesting the transmission of Web documents from one of said resource locations to one of said client display stations;

means, associated with the client display station requesting the transmission of Web documents, for tracking characteristics of said transmission including a first successful transmission of a requested Web document to a requesting display station following a failed transmission of a requested Web document, and means, responsive to the first successful transmission to said of a requested Web document to said requesting display station following a failed transmission of said requested Web document, for sending said tracked characteristics to at least one Web network server on the path of said requested transmission.

12. The computer program of claim 11 wherein said tracked characteristics include the number of failed requests by said one client station for transmission of said World Wide Web documents.

13. The computer program of claim 11 wherein said tracked characteristics include the time lapse between a request by said one client station for transmission of said World wide Web documents and the receipt of a failure of said transmission message by one client station.

14. The computer program of claim 11 wherein said tracked characteristics include the World Wide Web address of the resource location of a failed transmission.

15. The computer program of claim 11 further comprising:

World Wide Web browsing means at said client station requesting the transmission of Web documents including:

said means for requesting the transmission of Web documents from one of said resource locations to one of said client display stations;

said means, associated with the client display station requesting the transmission of Web documents, for tracking characteristics of said transmission including a first successful transmission of a requested Web document to a requesting display station following a failed transmission of a requested Web document, and said means, responsive to the first successful transmission of a requested Web document to said requesting display station following a failed transmission of said requested Web document, for sending said tracked characteristics to at least one Web network server on the path of said requested transmission.

* * * * *